(12) United States Patent
Clark et al.

(10) Patent No.: US 7,819,128 B2
(45) Date of Patent: Oct. 26, 2010

(54) ADJUSTABLE TRAILER HITCH MOUNT FOR AN UMBRELLA

(76) Inventors: Scotty O'Brian Clark, 107 Andi La., Anderson, SC (US) 29626; Jimmie Leroy Geddings, Jr., 527 McClure Rd., Anderson, SC (US) 29626

(*) Notice: Subject to any disclaimer, the term of this patent is extended or adjusted under 35 U.S.C. 154(b) by 138 days.

(21) Appl. No.: 12/283,232

(22) Filed: Sep. 10, 2008

(65) Prior Publication Data
US 2010/0059093 A1 Mar. 11, 2010

(51) Int. Cl.
*A45B 17/00* (2006.01)
*B60R 9/048* (2006.01)
*E04H 15/06* (2006.01)

(52) U.S. Cl. .................. 135/88.08; 135/16; 135/88.13; 224/519; 280/491.1

(58) Field of Classification Search .................. None
See application file for complete search history.

(56) References Cited

U.S. PATENT DOCUMENTS

| | | | | |
|---|---|---|---|---|
| D308,442 S | 6/1990 | Moll | ............................ | D3/40 |
| D330,630 S | 11/1992 | Loden | ............................ | D3/10 |
| 5,205,446 A * | 4/1993 | Greenberg | .................. | 224/497 |
| 5,752,636 A * | 5/1998 | Manley | ...................... | 224/405 |
| 5,857,741 A | 1/1999 | Anderson | .................. | 297/170 |
| 5,950,617 A | 9/1999 | Lorenz | ...................... | 126/276 |
| 6,032,917 A | 3/2000 | Shannon | ..................... | 248/514 |
| 6,082,269 A | 7/2000 | Padberg | ....................... | 108/44 |
| 6,189,458 B1 | 2/2001 | Rivera | .......................... | 108/44 |
| 6,722,380 B1 * | 4/2004 | Hafer | ........................... | 135/16 |
| 7,334,593 B2 * | 2/2008 | Avery | ....................... | 135/88.08 |

(Continued)

OTHER PUBLICATIONS http://www.shadeusa.com/hitch_umbrella_holder.htm; "The Automobrella hitch umbrella holder," pp. 1-3.

*Primary Examiner*—Lesley Morris
*Assistant Examiner*—Marc A Scharich
(74) *Attorney, Agent, or Firm*—Thomas L. Moses; Monahan & Moses, LLC

(57) ABSTRACT

The trailer hitch mount for an umbrella includes a square cross-section shaft that is adapted to slide into a standard sleeve-style trailer hitch receiver that is currently available on many vehicles. The shaft includes a series of holes along the sides thereof to receive a pin in order to secure the shaft to the trailer hitch receiver in a telescopic relationship. The series of holes allows the shaft length to be adjusted, so that the distance between the trailer hitch receiver and the opposed end of the shaft may be shortened or lengthened, as desired. The shaft includes two ends, one of which slides into the trailer hitch receiver, and the other end includes a hollow pivoting cylindrical tube that is used to receive the bottom end of an umbrella pole. The pivoting tube includes adjustment means, so that the pivoting tube may be tilted to a desired angle and secured in that position. For travel or storage purposes, the pivoting tube may be folded down and secured into a compact position parallel with the shaft. At an upper end of the pivoting tube is receiving and securing means for the umbrella pole. The umbrella pole, in a preferred embodiment, slides into the hollow pivoting tube and a hand screw positioned on the side of the pivoting tube at its upper end may be tightened against the umbrella pole and secured thereby.

6 Claims, 3 Drawing Sheets

U.S. PATENT DOCUMENTS

| | | | |
|---|---|---|---|
| 2005/0092213 A1 | 5/2005 | Wilson et al. | 108/44 |
| 2005/0241546 A1 | 11/2005 | Royse | 108/44 |
| 2006/0053667 A1* | 3/2006 | Andersen | 40/591 |
| 2006/0156600 A1* | 7/2006 | Barker | 40/591 |
| 2006/0162622 A1 | 7/2006 | Fisher | 108/44 |
| 2006/0254635 A1* | 11/2006 | Matheus et al. | 135/88.05 |
| 2009/0107390 A1* | 4/2009 | Lyle et al. | 116/173 |
| 2009/0183757 A1* | 7/2009 | Koch, III | 135/88.05 |

* cited by examiner

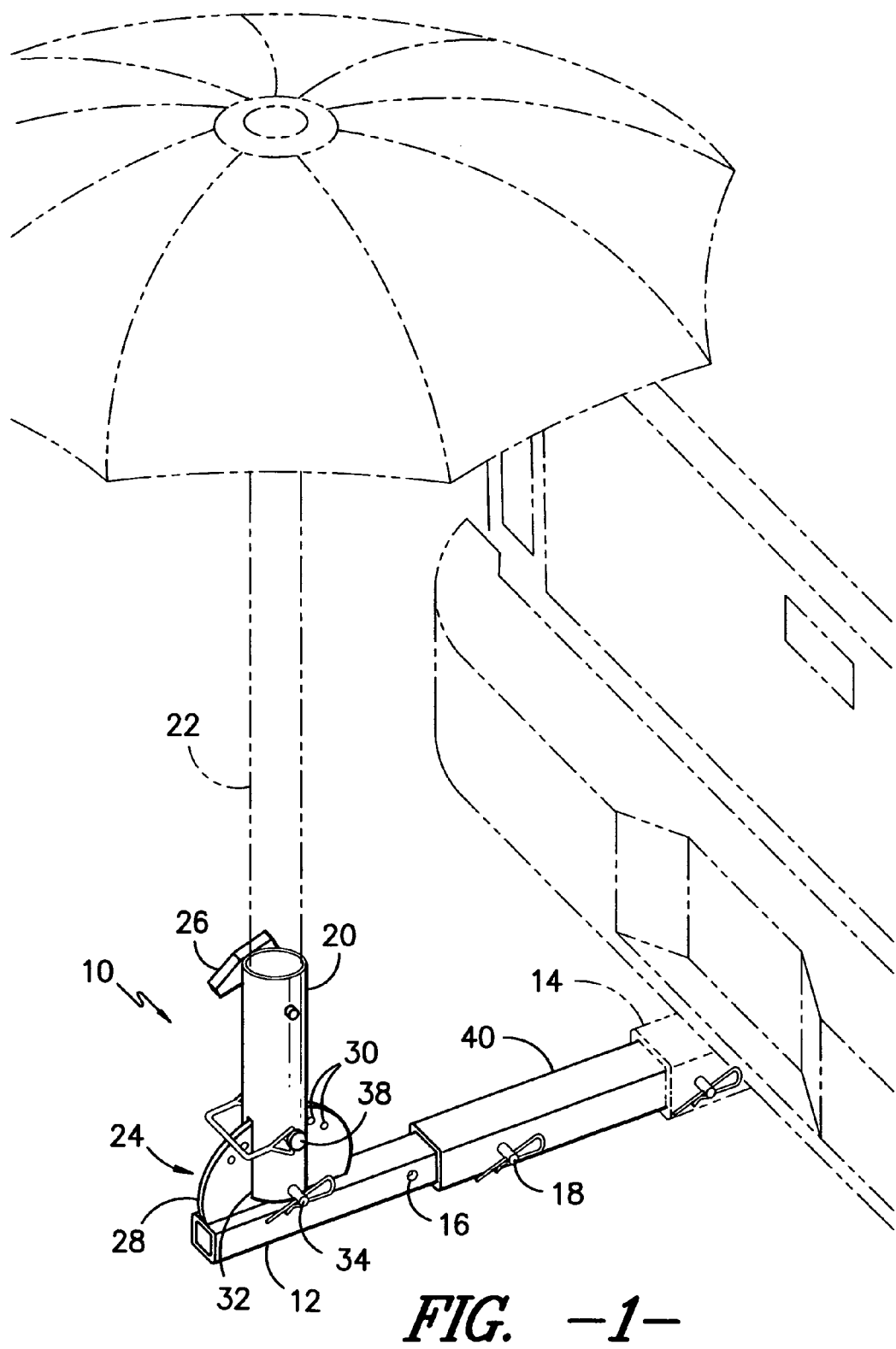
FIG. -1-

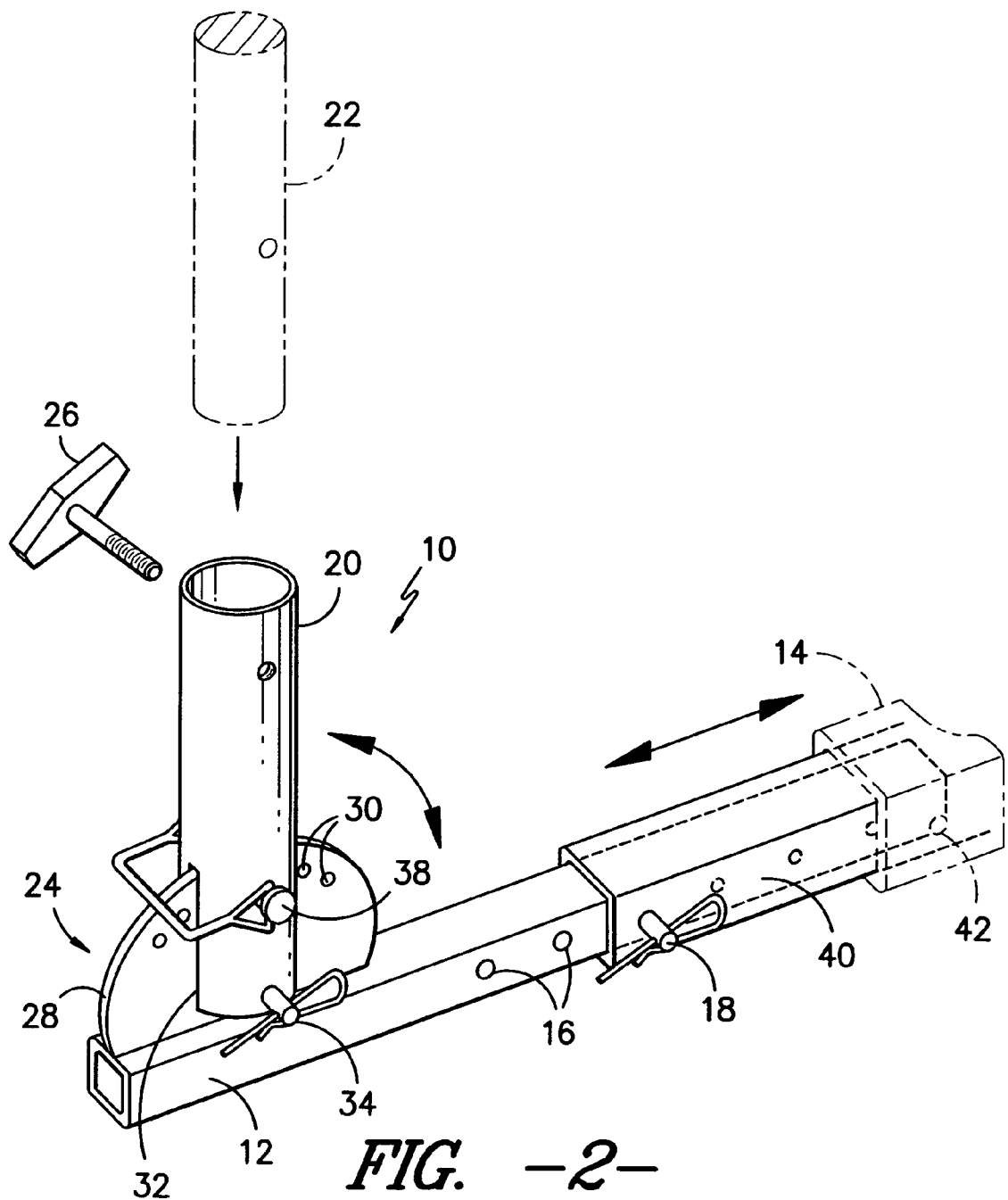
FIG. -2-

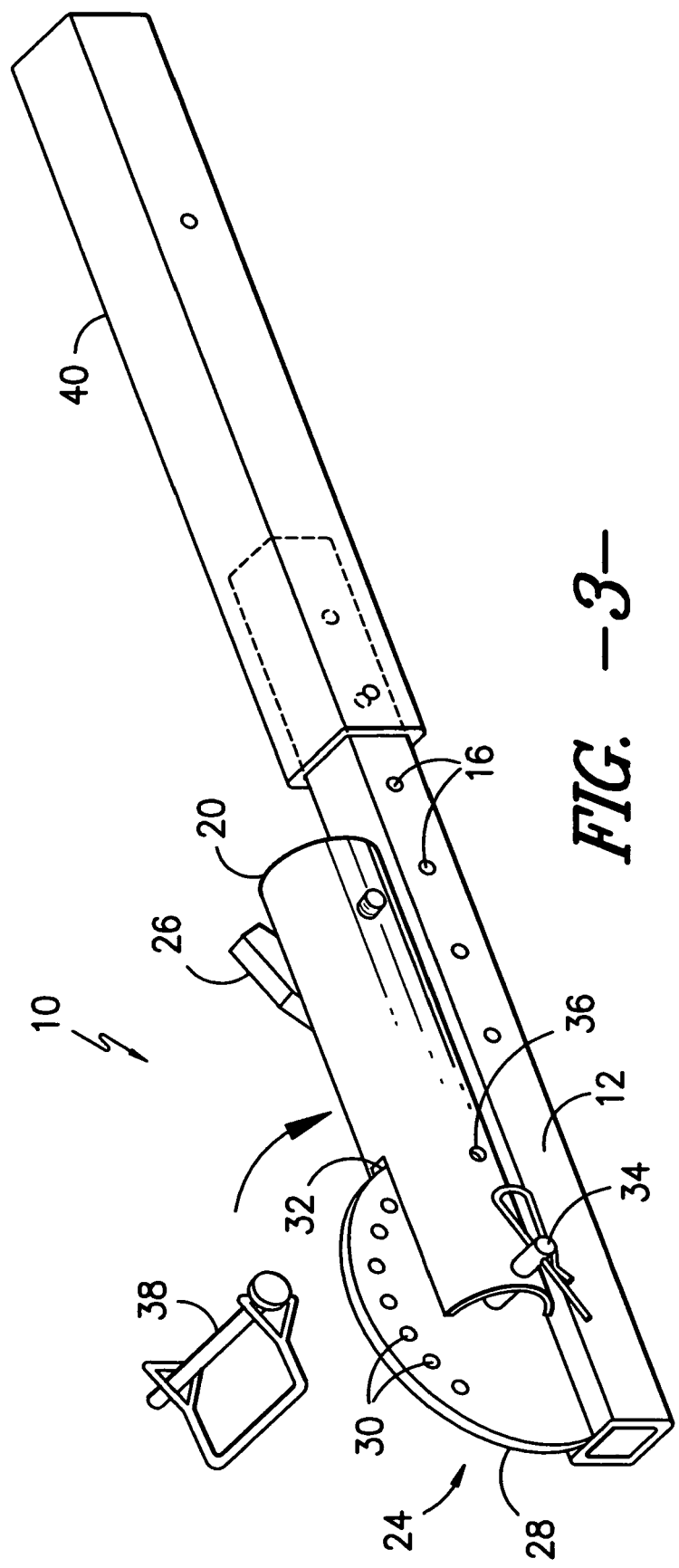
FIG. -3-

ADJUSTABLE TRAILER HITCH MOUNT FOR AN UMBRELLA

BACKGROUND OF THE INVENTION

1. Field of the Invention

The present invention relates generally to trailer hitch mounts that are used to attach various accessories to an automobile, truck or other vehicle via the trailer hitch receiver. More specifically, the present invention relates to an adjustable trailer hitch mount for an umbrella.

2. Description of the Prior Art

There are many systems and products currently available for attaching various types of accessories to a vehicle using the trailer hitch receiver. Such accessories include everything from grills, chairs and tables to portable toilets and luggage racks. It would be desirable to provide a portable sun umbrella support system for attachment to the rear of a vehicle, where it could be used for sun protection while fishing, tailgating, camping, on construction sites or at sporting events. And it would further be desirable to provide adjustment means on the umbrella support system or mount so that the position of the umbrella could be changed, as desired, in order to provide shade over a desired area.

None of the prior art, however, provides an adjustable umbrella mount that may be secured to a trailer hitch assembly, where the angle of the umbrella pole may be selected by a user, and where a variety of different types of umbrellas may be used. Further, the present invention may also include means to adjust the distance between the umbrella and the rear of the vehicle.

OBJECTS OF THE INVENTION

In view of the foregoing disadvantages inherent in the known types of trailer hitch mounts, it is an object of the present invention to provide a mount for an umbrella that attaches to a standard sleeve-style trailer hitch receiver.

It is a further object of the present invention to provide a trailer hitch umbrella mount that includes means for adjusting the angle of the umbrella pole, as well as means for adjusting the distance between the umbrella and the rear of the vehicle.

Yet another object of the present invention is to provide a trailer hitch mount for an umbrella that allows a variety of different umbrellas to be attached to a vehicle.

Still another object of the present invention is to provide a trailer hitch mount for an umbrella that may be folded into a compact position for travel or storage when the umbrella is not attached to the mount.

SUMMARY OF THE INVENTION

In a preferred embodiment, the trailer hitch mount for an umbrella includes a square cross-section shaft that is adapted to slide into a standard sleeve-style trailer hitch receiver that is currently available on many vehicles. The shaft includes a series of holes along the sides thereof to receive a pin, which also slides through corresponding holes in the trailer hitch receiver, in order to secure the shaft to the trailer hitch receiver in a telescopic relationship. The series of holes allows the shaft length to be adjusted, so that the distance between the trailer hitch receiver and the opposed end of the shaft may be shortened or lengthened, as desired.

The shaft includes two ends, one of which slides into the trailer hitch receiver, and the other end includes a hollow pivoting cylindrical tube that is used to receive the bottom end of an umbrella pole. The pivoting tube includes adjustment means, so that the pivoting tube may be tilted to a desired angle and secured in that position. For travel or storage purposes, the pivoting tube may be folded down and secured into a compact position parallel with the shaft. At an upper end of the pivoting tube is receiving and securing means for the umbrella pole. The umbrella pole, in a preferred embodiment, slides into the hollow pivoting tube and a hand screw positioned on the side of the pivoting tube at its upper end may be tightened against the umbrella pole and secured thereby.

Optionally, a telescoping extension may be employed in conjunction with the shaft. In this embodiment, the telescoping extension is inserted and secured into the trailer hitch receiver in the desired position, and the shaft is positioned in slidable, telescoping relation within the telescoping extension. The pivoting tube for receiving the umbrella is disposed at the outer end of the shaft. Thus, the telescoping extension may be used to increase the distance between the umbrella and the rear of the vehicle. The telescoping extension also includes, in a preferred embodiment, a series of holes and a spring loaded push pin adapted to engage any of the chosen holes so that the extension may be extended or retracted to a desired length.

BRIEF DESCRIPTION OF THE DRAWINGS

These and other features, aspects, and advantages of the present invention will become better understood with regard to the following description, appended claims, and accompanying drawings where:

FIG. 1 is a perspective drawing of one embodiment of the adjustable trailer hitch mount for an umbrella, showing the device secured to a trailer hitch receiver of a vehicle, and further showing an umbrella secured to the mount;

FIG. 2 is a perspective view of one embodiment of the adjustable trailer hitch mount for an umbrella, together with a telescoping shaft extension; and FIG. 3 is a perspective view of one embodiment of the adjustable trailer hitch mount for an umbrella, wherein the pivoting tube is folded down in parallel relation with the shaft member for storage or travel.

DETAILED DESCRIPTION OF THE INVENTION

A first embodiment of the adjustable trailer hitch mount 10 for an umbrella is shown in FIG. 1. The mount includes a shaft member 12 having and square cross section and two ends, with the first end being adapted to slide into a standard sleeve-style trailer hitch receiver 14 that is currently available on many vehicles. The shaft member 12 may include adjustment means to adjust the length of the shaft that extends from the receiver.

In a preferred embodiment, such length adjustment means may comprise a series of holes 16 disposed along both sides of the shaft in corresponding relation, so that a pin 18 may be used to secure the shaft 12 to the trailer hitch receiver 14 through a hole 42 in the receiver. The distal end of the shaft includes a hollow pivoting cylindrical tube 20 that is used to receive the bottom end of an umbrella pole 22. The pivoting tube 20 includes angular adjustment means 24, so that the pivoting tube 20 may be tilted to a desired angle and secured in that position. For travel or storage purposes, the pivoting tube 20 may be folded down and secured into a compact position parallel with the shaft, with the umbrella removed therefrom, as shown in FIG. 3. At an upper end of the pivoting tube is receiving and securing means for the umbrella pole 22. The umbrella pole 22, in a preferred embodiment, slides into the hollow pivoting tube 20 and a hand screw 26 positioned on the side of the pivoting tube 20 at its upper end may be tightened against the umbrella pole 22 and secured thereby. Other means may be used to secure the umbrella pole 22 within the pivoting tube 20.

The angular adjustment means 24, in one embodiment, includes a half-circle shaped guide member 28 that is vertically disposed on an upper side of the shaft. The guide member 28 includes a series of holes 30 about the semi-circular perimeter along the upper portion thereof. The hollow pivoting tube 20 includes two longitudinal slits 32 in planar relation at its bottom end. The pivoting tube 20 fits over the guide member 28, which is disposed within the planar longitudinal slits 32, and is fixed to the shaft with a pin 34 that allows the pivoting tube 20 to pivot or rotate about 180 degrees along the longitudinal plane of the shaft 12. Holes 36 are disposed in the sides of the pivoting tube 20, and these holes 36 correspond with the holes 30 in the guide member 28, so that a pin 38 may be employed to secure the pivoting tube 20 at any desired angle with respect to the shaft 12. Although one embodiment of the angular adjustment means has been described, it is contemplated and understood that other means may be used to adjust and secure the pivoting tube at a desired angle with respect to the shaft member.

Optionally, a telescoping shaft extension 40 may be employed in conjunction with the shaft. In this embodiment, the shaft 12 is inserted and secured into the telescoping shaft extension 40 in the desired position and is secured by the pin 18, and the telescoping shaft extension 40 is positioned in slidable, telescoping relation within the trailer hitch receiver 14, also secured by a pin. Thus, the telescoping extension 40 may be used to further adjust and extend the distance between the umbrella 22 and the rear of the vehicle. The telescoping extension 40 also includes, in a preferred embodiment, a series of holes (as shown in FIG. 2) so that the extension 40 may be extended or retracted to a desired length.

One advantage to the present invention is that various types, sizes and shapes of umbrellas may be used and attached to the umbrella mount. In one embodiment, the umbrella includes height adjustment means.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An adjustable trailer hitch mount for an umbrella comprising:

a shaft member having a first end and a second end, wherein said first end is adapted to be received into a trailer hitch receiver of a vehicle;

a pivoting tube adapted to receive and secure a bottom end of an umbrella pole, said pivoting tube including planar longitudinal slits extending through a lower portion thereof and said pivoting tube being disposed at said second end of said shaft member; and a planar guide member disposed on an upper side of said shaft member and extending upwardly therefrom, said guide member including a plurality of holes extending therethrough, and wherein said pivoting tube is adapted to fit over and engage with said guide member to be adjusted and secured at a desired angle corresponding to one of said plurality of holes.

2. The adjustable trailer hitch mount for an umbrella set forth in claim 1, wherein said shaft member includes length adjustment means for adjusting a length of said shaft member extending from said trailer hitch receiver.

3. The adjustable trailer hitch mount for an umbrella set forth in claim 1, further including an umbrella having an umbrella pole, wherein a bottom end of said umbrella pole is removably secured within said pivoting tube.

4. An adjustable trailer hitch mount for an umbrella comprising:

a shaft member having a first end and a second end;

a telescoping shaft extension disposed in telescoping relation with the first end of said shaft member, wherein an opposed end of said shaft extension is adapted to be received into a trailer hitch receiver on a rear end of a vehicle, and wherein said shaft extension includes adjustment means for controlling a length of the shaft extension that extends from said trailer hitch receiver;

a pivoting tube adapted to receive and secure a bottom end of an umbrella pole, said pivoting tube including planar longitudinal slits extending through a lower portion thereof and said pivoting tube being disposed at said second end of said shaft member; and a planar guide member disposed on an upper side of said shaft member and extending upwardly therefrom, said guide member including a plurality of holes extending therethrough, and wherein said pivoting tube is adapted to fit over and engage with said guide member to be adjusted and secured at a desired angle corresponding to one of said plurality of holes.

5. The adjustable trailer hitch mount for an umbrella set forth in claim 4, wherein said shaft member includes length adjustment means for adjusting a length of said shaft member extending from said telescoping shaft extension.

6. The adjustable trailer hitch mount for an umbrella set forth in claim 4, further including an umbrella having an umbrella pole, wherein a bottom end of said umbrella pole is removably secured within said pivoting tube.

* * * * *